US012027794B2

(12) United States Patent
Wang et al.

(10) Patent No.: US 12,027,794 B2

(45) Date of Patent: Jul. 2, 2024

(54) ELECTRICAL CONNECTOR HAVING INSULATIVE HOUSING WITH SLOTS DEFINED BY DIVIDING WALLS OF DIFFERENT LENGTHS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Cai-Yuan Wang, Kunshan (CN); Zhi-Yong Zhou, Kunshan (CN); Ying-Xing Ma, Kunshan (CN); Chien-Hsun Huang, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 378 days.

(21) Appl. No.: 17/558,927

(22) Filed: Dec. 22, 2021

(65) Prior Publication Data

US 2022/0209455 A1 Jun. 30, 2022

(30) Foreign Application Priority Data

Dec. 28, 2020 (CN) ......................... 202011575694.3

(51) Int. Cl.

*H01R 13/502* (2006.01)
*H01R 12/72* (2011.01)

(Continued)

(52) U.S. Cl.

CPC ......... *H01R 13/502* (2013.01); *H01R 12/727* (2013.01); *H01R 13/6581* (2013.01); *H01R 2107/00* (2013.01)

(58) Field of Classification Search

CPC ................ H01R 13/502; H01R 12/727; H01R 13/6581; H01R 2107/00; H01R 13/6477; H01R 13/02; H01R 13/405

See application file for complete search history.

(56) References Cited

U.S. PATENT DOCUMENTS 6,824,419 B1 * 11/2004 Wu .................... H01R 13/6315 439/378
8,221,139 B2 7/2012 Qin et al.

(Continued)

FOREIGN PATENT DOCUMENTS

| | | | |
|---|---|---|---|
| CN | 201430232 | Y | 3/2010 |
| CN | 107799211 | A | 3/2018 |
| CN | 111082267 | Y | 4/2020 |

*Primary Examiner* — Abdullah A Riyami
*Assistant Examiner* — Nader J Alhawamdeh
(74) *Attorney, Agent, or Firm* — Ming Chieh Chang

(57) ABSTRACT

An electrical connector includes: an insulative housing having a row of slots defined by plural dividing walls thereof, and plural contacts secured in the insulative housing and each including a securing portion, a front contacting portion disposed in a corresponding slot, and a rear tail, wherein the plurality of dividing walls includes a group of first dividing walls each having a first length and a group of second dividing walls each having a second length along a front-to-back direction, and the first length is shorter than the second length to expose to air a larger extent of the front contacting portions of associated contacts disposed in the slots defined by the group of first dividing walls with respect to the front contacting portions of associated contacts disposed in the slots defined by the group of second dividing walls.

3 Claims, 9 Drawing Sheets

(51) Int. Cl.
*H01R 13/6581* (2011.01)
*H01R 107/00* (2006.01)

(56) References Cited

U.S. PATENT DOCUMENTS

| | | | | |
|---|---|---|---|---|
| 8,814,585 | B2 * | 8/2014 | Yu | H01R 12/7005<br>439/247 |
| 8,864,506 | B2 | 10/2014 | Little et al. | |
| 9,401,570 | B2 | 7/2016 | Phillips et al. | |
| 10,411,408 | B2 * | 9/2019 | Wu | H01R 13/6272 |
| 11,735,848 | B2 * | 8/2023 | Wang | H01R 13/6658<br>439/78 |
| 11,769,962 | B2 * | 9/2023 | Lin | H01R 13/5213<br>439/701 |
| 2010/0210124 | A1 * | 8/2010 | Li | H01R 12/724<br>439/108 |
| 2015/0207269 | A1 * | 7/2015 | Sha | H01R 12/707<br>439/83 |
| 2018/0323544 | A1 * | 11/2018 | Wu | H01R 13/6275 |
| 2022/0123497 | A1 * | 4/2022 | Lin | H01R 13/521 |
| 2022/0209455 | A1 * | 6/2022 | Wang | H01R 13/502 |

* cited by examiner

ELECTRICAL CONNECTOR HAVING INSULATIVE HOUSING WITH SLOTS DEFINED BY DIVIDING WALLS OF DIFFERENT LENGTHS

BACKGROUND OF THE INVENTION

1. Field of the Invention

The present invention relates to an electrical connector comprising an insulative housing having a row of slots defined by a plurality of dividing walls thereof and a plurality of contacts secured to the insulative housing and each including a securing portion, a front contacting portion disposed in a corresponding slot, and a rear tail, wherein the plurality of dividing walls consists of a first group of a first length and a second group of a second length along a front-to-back direction for characteristic impedance consideration.

2. Description of Related Arts

Different electrical connector standards, such as HDMI, USB 3.0, USB Type-C, etc., have different interfaces and mechanical and electrical requirements. To provide an electrical connector with a single interface for transmitting powers and signals complying with more than one standard may not be practical because of, for example, different characteristic impedance requirements.

SUMMARY OF THE INVENTION

An electrical connector comprises: an insulative housing having a row of slots defined by a plurality of dividing walls thereof; and a plurality of contacts secured in the insulative housing and each including a securing portion, a front contacting portion disposed in a corresponding slot, and a rear tail, wherein the plurality of dividing walls includes a group of first dividing walls each having a first length and a group of second dividing walls each having a second length along a front-to-back direction, and the first length is shorter than the second length to expose to air a larger extent of the front contacting portions of associated contacts disposed in the slots defined by the group of first dividing walls with respect to the front contacting portions of associated contacts disposed in the slots defined by the group of second dividing walls.

DETAILED DESCRIPTION OF THE PREFERRED EMBODIMENTS

Figure 1:
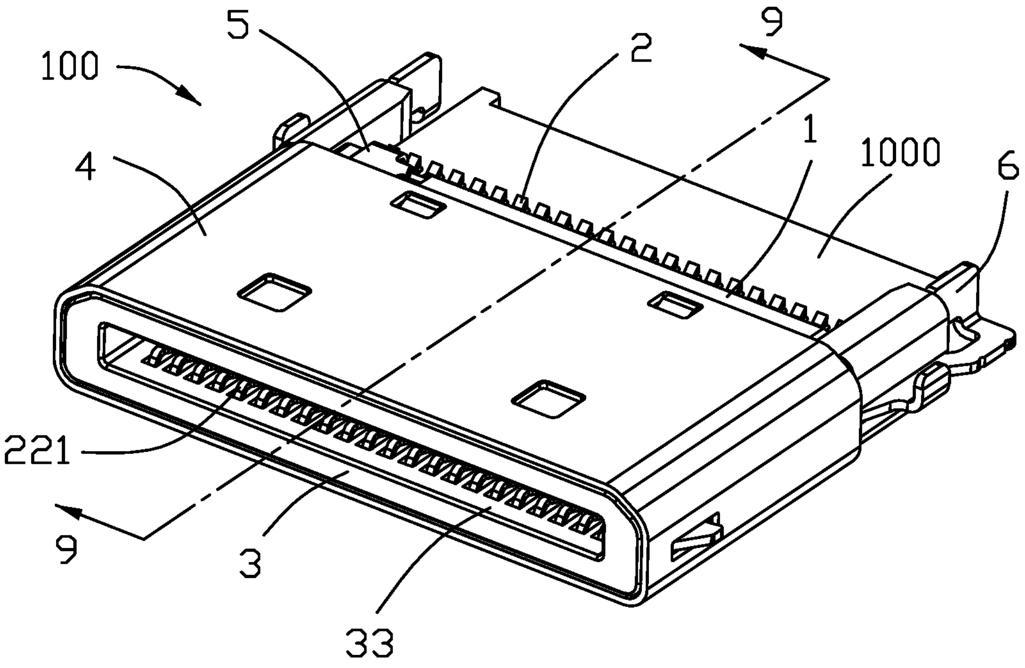
FIG. 1 is a perspective view of an electrical connector in accordance with the present invention.
Figure 2:
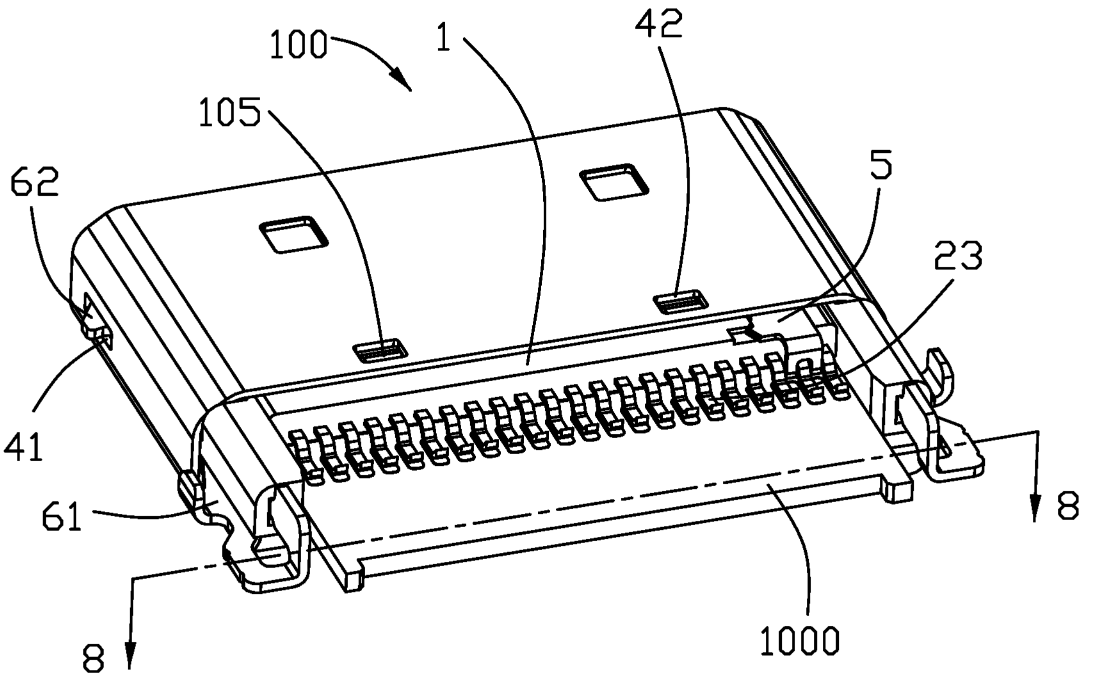
FIG. 2 is another perspective view of the electrical connector.
Figure 3:
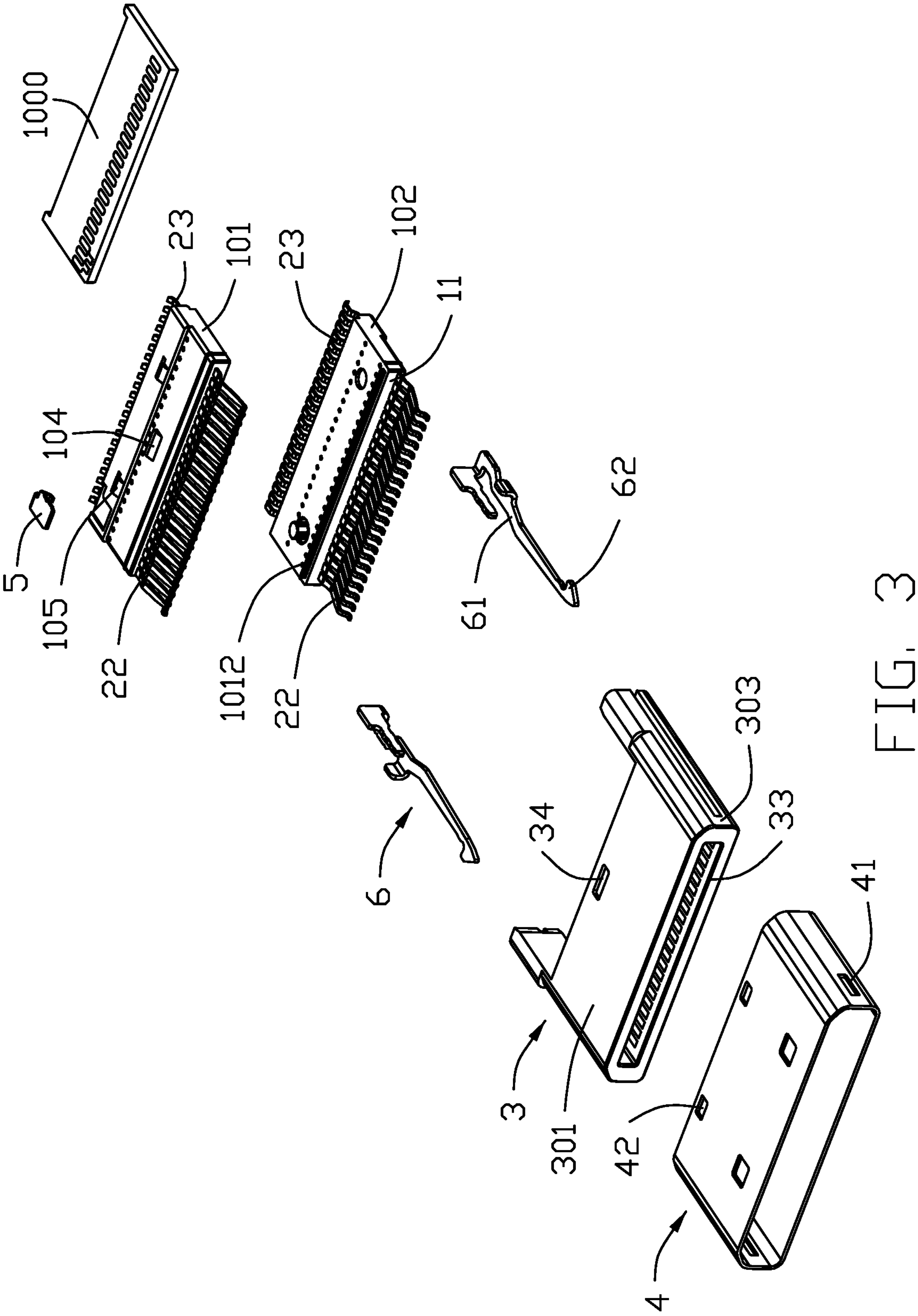
FIG. 3 is an exploded view of the electrical connector.
Figure 4:
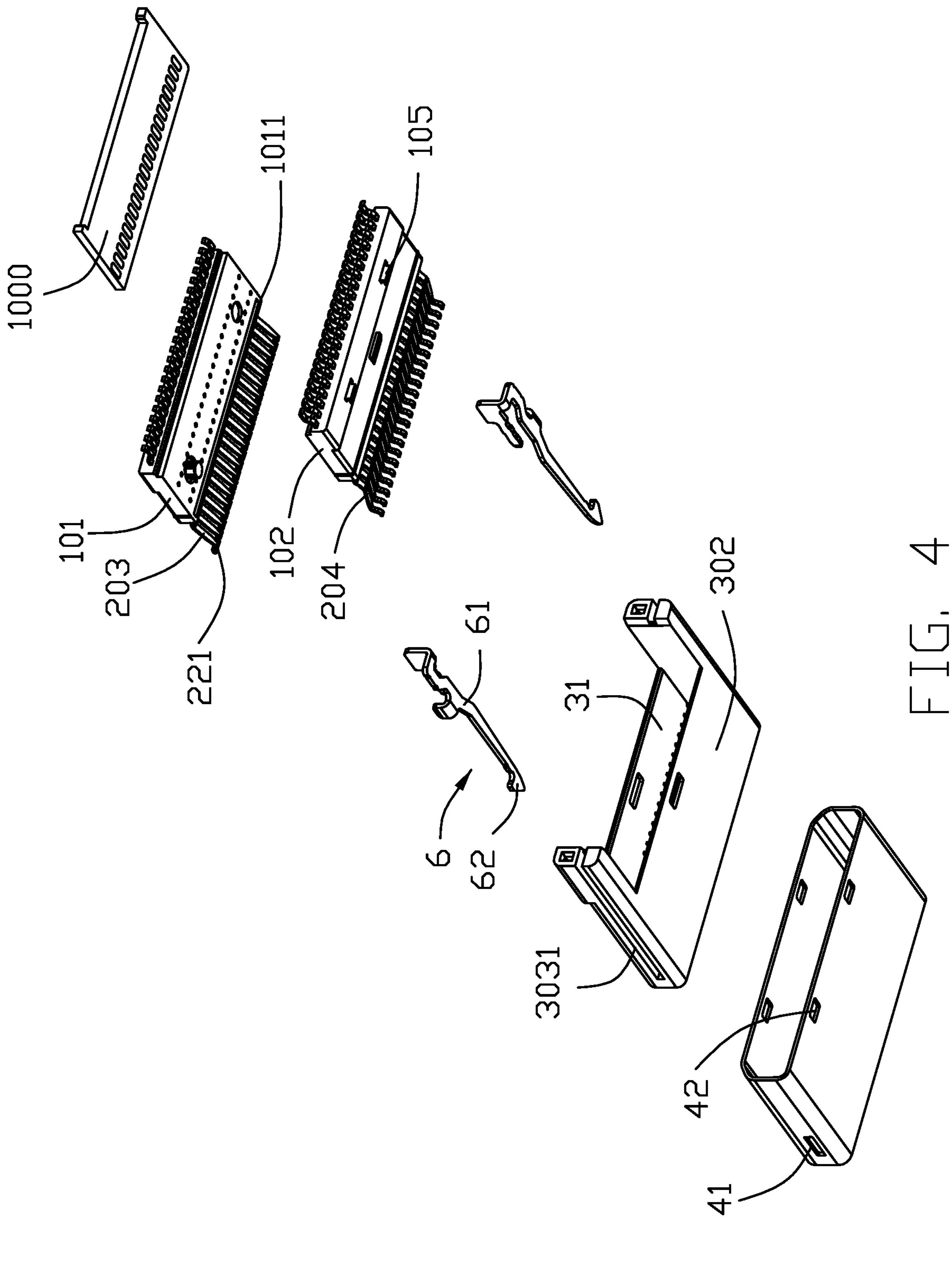
FIG. 4 is another exploded view of the electrical connector.
Figure 5:
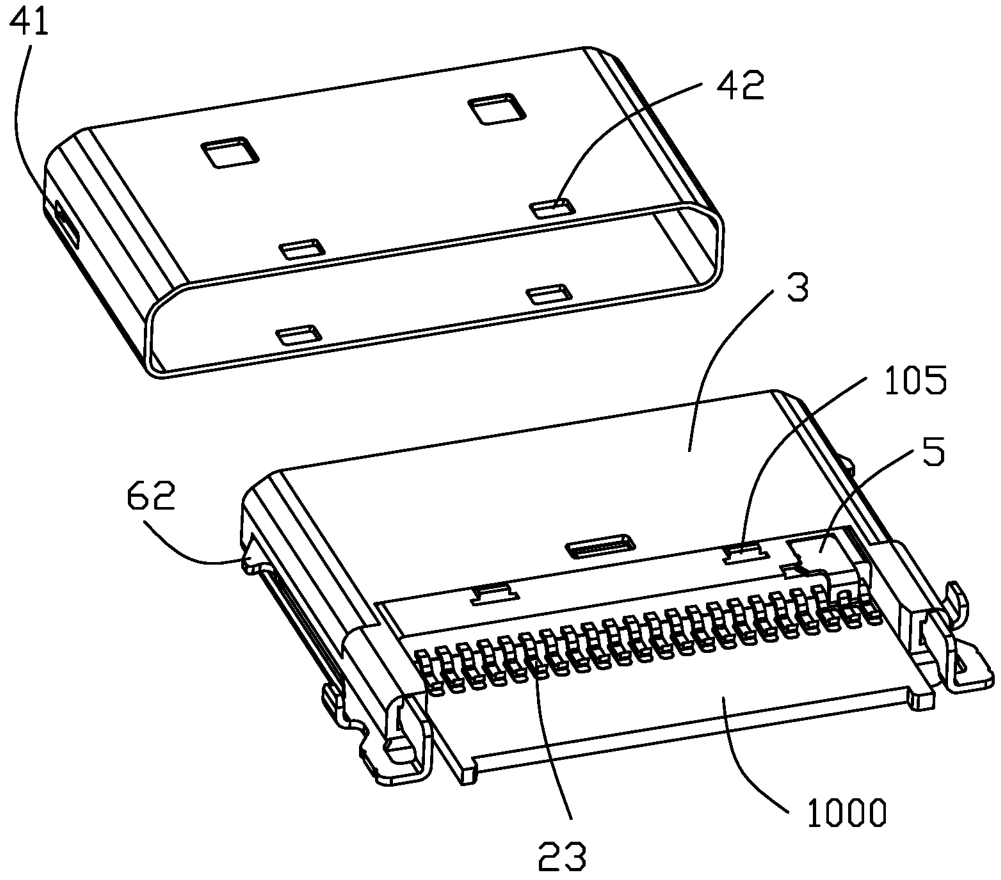
FIG. 5 is a partially exploded view of FIG. 2.
Figure 6:
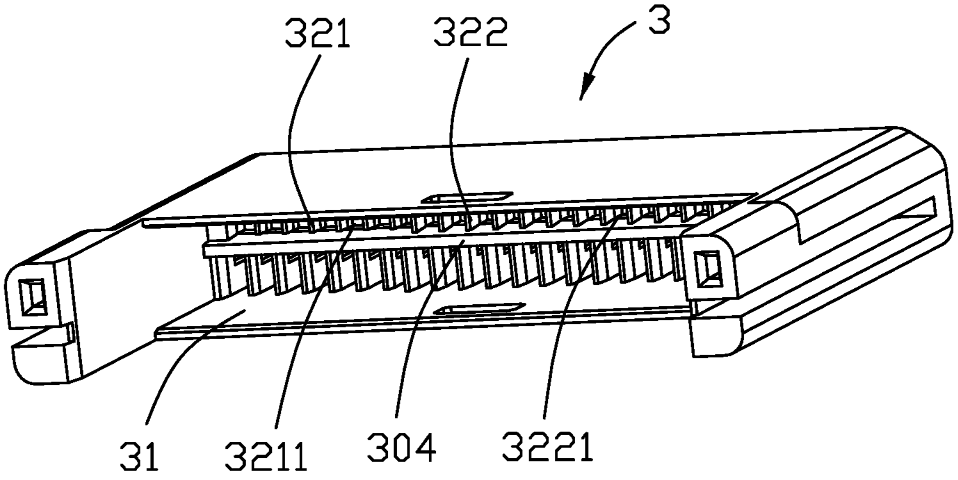
FIG. 6 is a perspective view of an insulative housing of the electrical connector.
Figure 7:
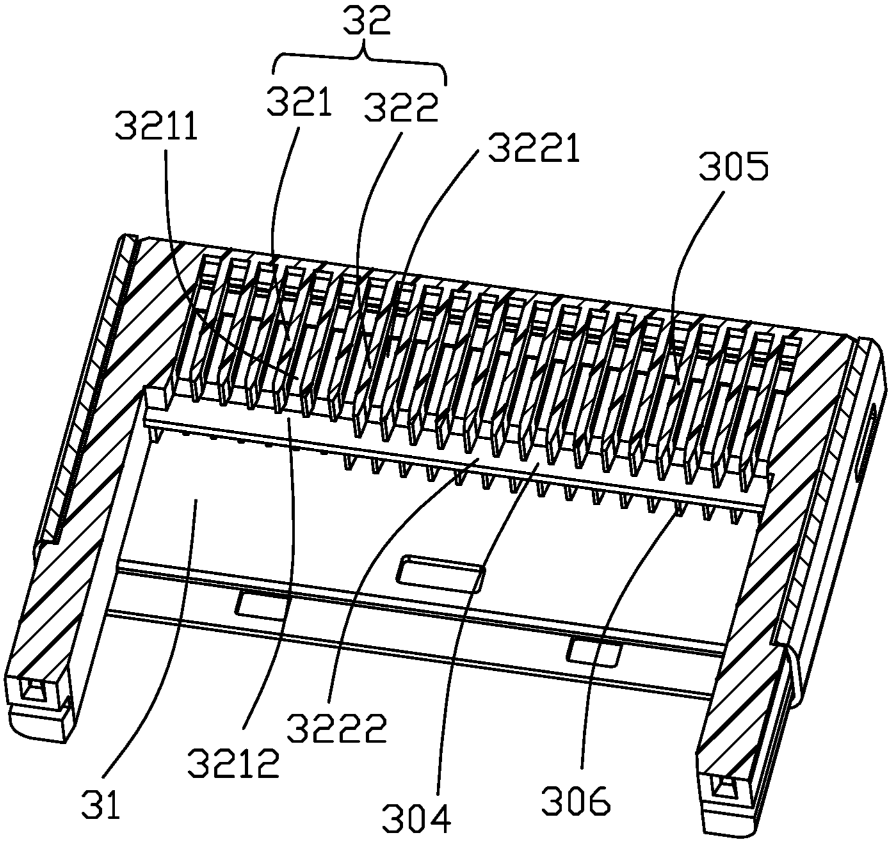
FIG. 7 is a cross-sectional view of the insulative housing and a metallic cover of the electrical connector.
Figure 8:
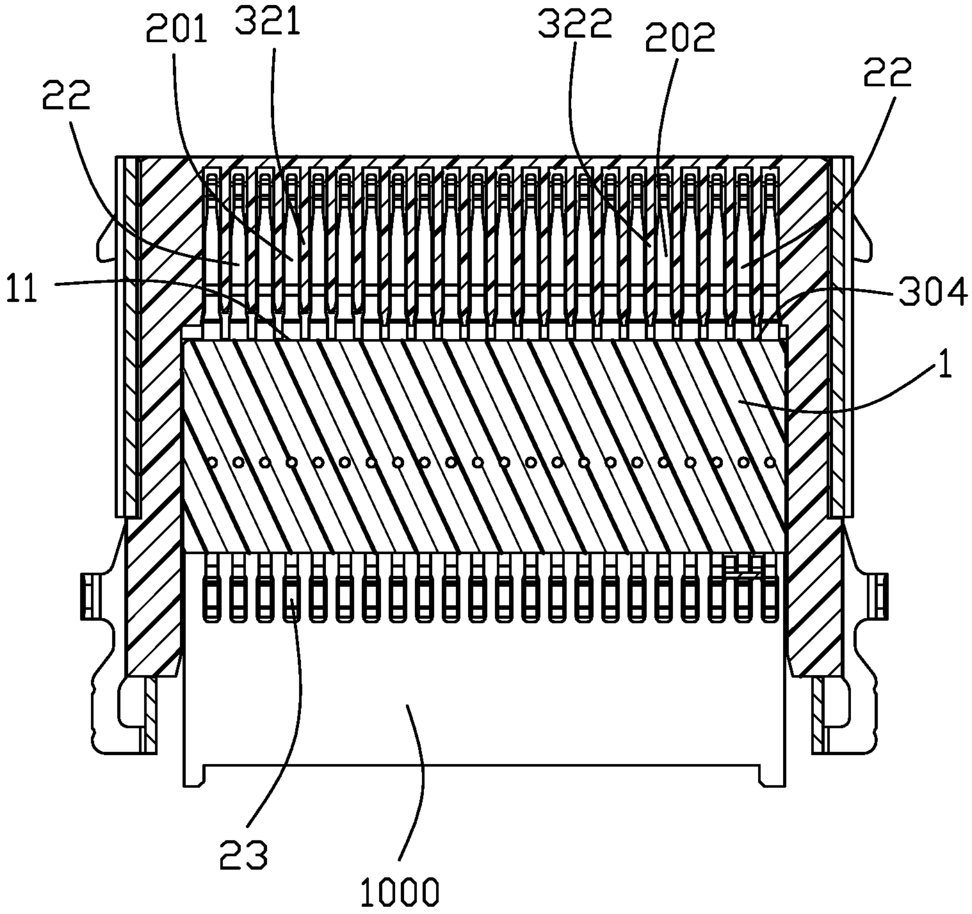
FIG. 8 is a cross-sectional view of the electrical connector taken along line A-A in FIG. 2.
Figure 9:
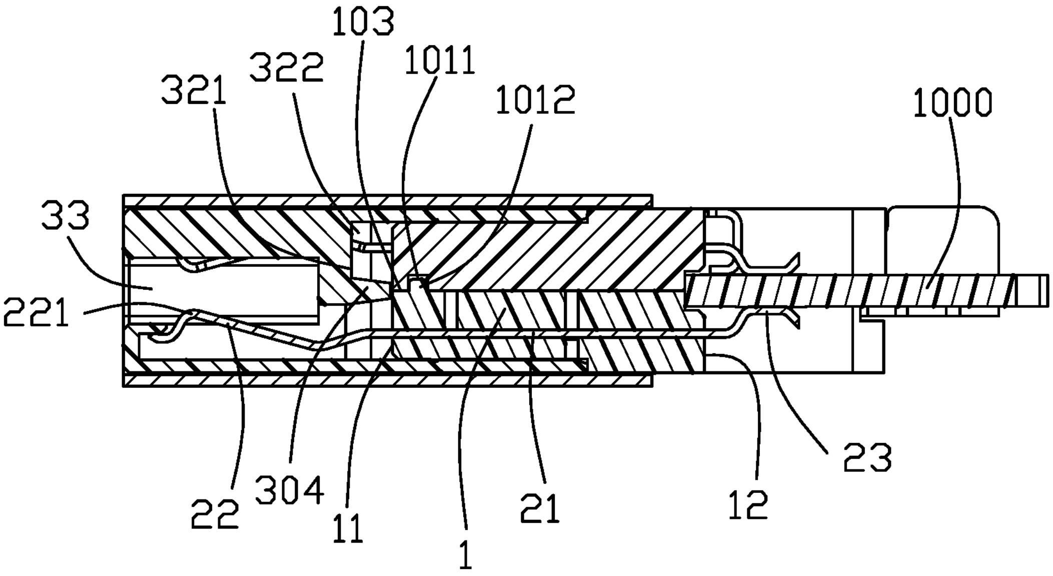
FIG. 9 is a cross-sectional view of the electrical connector taken along line B-B in FIG. 1.

Referring to FIGS. 1-9, an electrical connector 100 comprises an insulator 1, a plurality of contacts 2 secured to the insulator 1, an internal printed circuit board (PCB) 1000, an insulative housing 3 receiving the insulator 1, and a metallic cover 4 enclosing the insulative housing 3. The electrical connector 100 may further comprise a coupling piece 5 sandwiched between the insulative housing 3 and the metallic cover 4 and a pair of side latches 6 secured to the insulative housing 3. As is known in this art, a rear end of the PCB 1000 may be connected to a cable through any appropriate means to obtain a cable end connector.

The plurality of contacts 2 include a first group of contacts 201 and a second group of contacts 202. Each contact 201 and each contact 202 have same shape and dimension. Therefore, the electrical connector 100 may be used for transmitting both HDMI and USB signals.

The first group of contacts 201 and the second group of contacts 202 are designed to meet different characteristic impedance requirements. Therefore, the first group of contacts 201 are designed to be exposed to air to an extent more than the second group of contacts 202 are exposed to air, as detailed below.

Each of the contacts 201 and 202 has a securing portion 21 secured to the insulator 1, a front contacting portion 22 extending forwardly beyond the insulator 1, and a rear tail 23 extending forwardly beyond the insulator 1. The insulative housing 3 has two rows of slots at a front thereof defined by corresponding dividing walls 32 and a rear chamber 31. The dividing walls 32 include a group of first dividing walls 321 and a group of second dividing walls 322. Each row of slots include first slots 3211 defined by the first dividing walls 321 for accommodating the first group of contacts 201 and second slots 3221 defined by the second dividing walls 322 for accommodating the second group of contacts 202. Each first dividing wall 321 has a first length along a front-to-back direction and each second dividing wall 322 has a second length along the front-to-back direction which is longer than the first length. By making the first dividing wall 321 shorter than the second dividing wall 322, the contacting portions 22 of the first group of contacts 201 are more exposed to air than the contacting portions 22 of the second group of contacts 202 are exposed to air.

The insulative housing 3 has a front mating chamber 33 in communication with the first and second slots 3211 and 3221. Each contacting portion 22 has a mating end 221 protruding into the mating chamber 33.

The plurality of contacts 2 in this embodiment include an upper row of contacts 203 and a lower row of contacts 204. The insulator 1 in this embodiment includes an upper base 101 insert molded with the upper row of contacts 203 and a lower base 102 insert molded with the lower row of contacts 204. The upper base 101 and the lower base 102 may have corresponding hole 1011 and post 1021 for positioning purpose as well as for moisture prevention along seam line 103.

The insulative housing 3 has a top wall 301, a bottom wall 302, and a pair of side walls 303. The side wall 303 has a slot 3031 receiving a main body 61 of the side latch 6. The metallic cover 4 encloses the insulative housing 3 and the insulator 1 and has a pair of side openings 41. The main body 61 of the side latch 6 has a protrusion 62. The insulator 1 has first protrusions 104 engaging corresponding holes 34 of the insulative housing 3 and second protrusions 105 engaging corresponding holes 42 of the metallic cover 4.

The insulative housing 3 has a middle wall 304 disposed between the top wall 301 and the bottom wall 302. The dividing walls 32 include an upper row of dividing walls 305 and a lower row of dividing walls 306 of which each row contains respective groups of first and second dividing walls 321 and 322. A front face 11 of the insulator 1 abuts against a rear face of the middle wall 304, specifically at a junction seam 103 of the upper and lower bases 101 and 102. A transverse dimension of the middle wall 304 is greater than that of the junction seam 103 to prevent moisture from entering. A first void space 3212 is formed between a rear end of the first slots 3211 and the rear face of the middle wall 304; a second void space 3222 is formed between a rear end of the second slots 3221 and the rear face of the middle wall 304. The first void space 3212 exposes the first group of contacts 201 to more air than the second void space 3222 exposes the second group of contacts 202.

What is claimed is:

1. An electrical connector comprising:

an insulative housing having a row of slots defined by a plurality of dividing walls thereof; and a plurality of contacts secured in the insulative housing and each including a securing portion, a front contacting portion disposed in a corresponding slot, and a rear tail; wherein the plurality of dividing walls includes a group of first dividing walls each having a first length and a group of second dividing walls each having a second length along a front-to-back direction; and the first length is shorter than the second length to expose to air a larger extent of the front contacting portions of associated contacts disposed in the slots defined by the group of first dividing walls with respect to the front contacting portions of associated contacts disposed in the slots defined by the group of second dividing walls.

2. The electrical connector as claimed in claim 1, wherein the plurality of contacts are mounted to an insulator, and the insulator is secured to the insulative housing.

3. The electrical connector as claimed in claim 1, further comprising an internal printed circuit board (PCB), and wherein the rear tails of the plurality of contacts are terminated to the PCB.

* * * * *